(12) United States Patent
Uhl

(10) Patent No.: US 8,040,513 B2
(45) Date of Patent: Oct. 18, 2011

(54) DUAL EMISSION MICROSCOPE

(75) Inventor: Rainer Uhl, Graefelfing (DE)

(73) Assignees: TILL I.D. GmbH, Graefelfing (DE); Ludwigs-Maximilians-Universitaet Muenchen, Munich (DE)

( * ) Notice: Subject to any disclaimer, the term of this patent is extended or adjusted under 35 U.S.C. 154(b) by 685 days.

(21) Appl. No.: 12/141,378

(22) Filed: Jun. 18, 2008

(65) Prior Publication Data

US 2009/0316258 A1     Dec. 24, 2009

(51) Int. Cl.
G01J 3/36 (2006.01)
G01J 3/51 (2006.01)
G02B 21/36 (2006.01)

(52) U.S. Cl. .......................... 356/402; 359/368; 359/371

(58) Field of Classification Search .......... 356/388–398, 356/402; 359/368, 371, 634
See application file for complete search history.

(56) References Cited

U.S. PATENT DOCUMENTS

| | | | |
|---|---|---|---|
| 5,337,081 A * | 8/1994 | Kamiya et al. | 348/61 |
| 5,793,523 A * | 8/1998 | Twisselmann | 359/363 |
| 5,963,311 A * | 10/1999 | Craig et al. | 356/43 |
| 6,671,089 B2 * | 12/2003 | Nishida et al. | 359/385 |
| 6,814,484 B2 * | 11/2004 | Yano et al. | 374/121 |
| 2004/0032650 A1 * | 2/2004 | Lauer | 359/385 |
| 2006/0007343 A1 * | 1/2006 | Thomas | 348/336 |

FOREIGN PATENT DOCUMENTS

JP    2004361391 A   * 12/2004

* cited by examiner

*Primary Examiner* — Mark Consilvio
(74) *Attorney, Agent, or Firm* — Roberts Mlotkowski Safran & Cole, P.C.; David S. Safran

(57) ABSTRACT

There is provided a microscope device comprising: means for creating a collimated beam of light collected from a sample and comprising at least a first spectral range and a second spectral range, means for separating the collimated beam into a first beam containing a higher percentage of light of the first spectral range than light of the second spectral range and a second beam containing a lower percentage of light of the first spectral range than light of the second spectral range, means for reflecting the first beam, means for reflecting the second beam, means for combining the first beam and the second beam, a detector, and means for imaging the combined first and second beam onto the detector in order to create an image of the sample on the detector, wherein the means for reflecting the first beam and the means for reflecting the second beam are arranged in such a manner that the image created by the first beam and the image created by the second beam are shifted relative to each other on the detector, wherein the means for reflecting the first beam is adapted to invert handedness of the first beam, and wherein the means for reflecting the second beam is adapted to preserve handedness of the second beam.

26 Claims, 7 Drawing Sheets

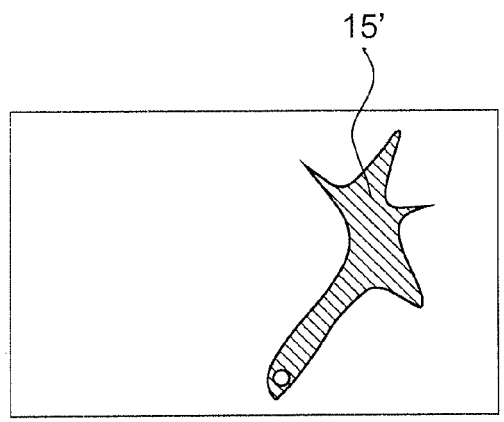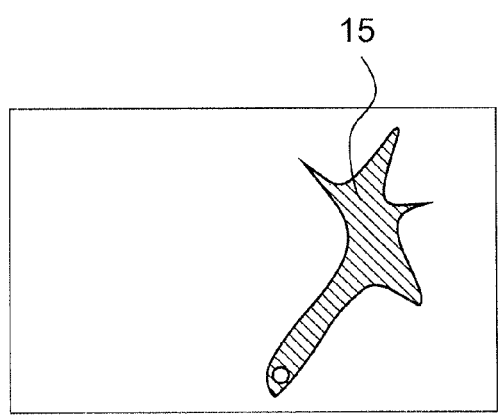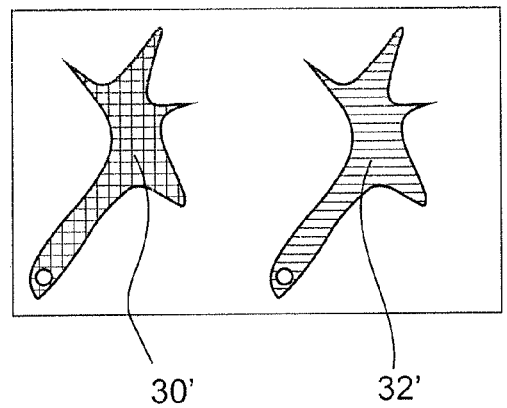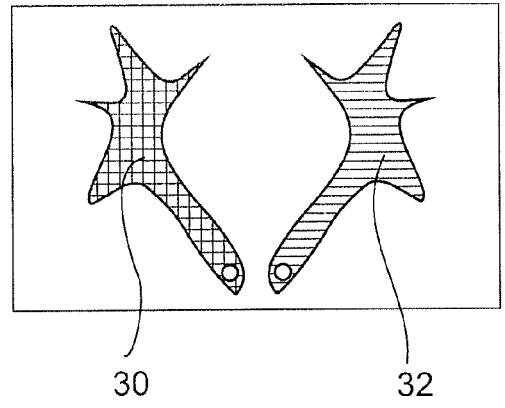
FIG. 2a			FIG. 2b

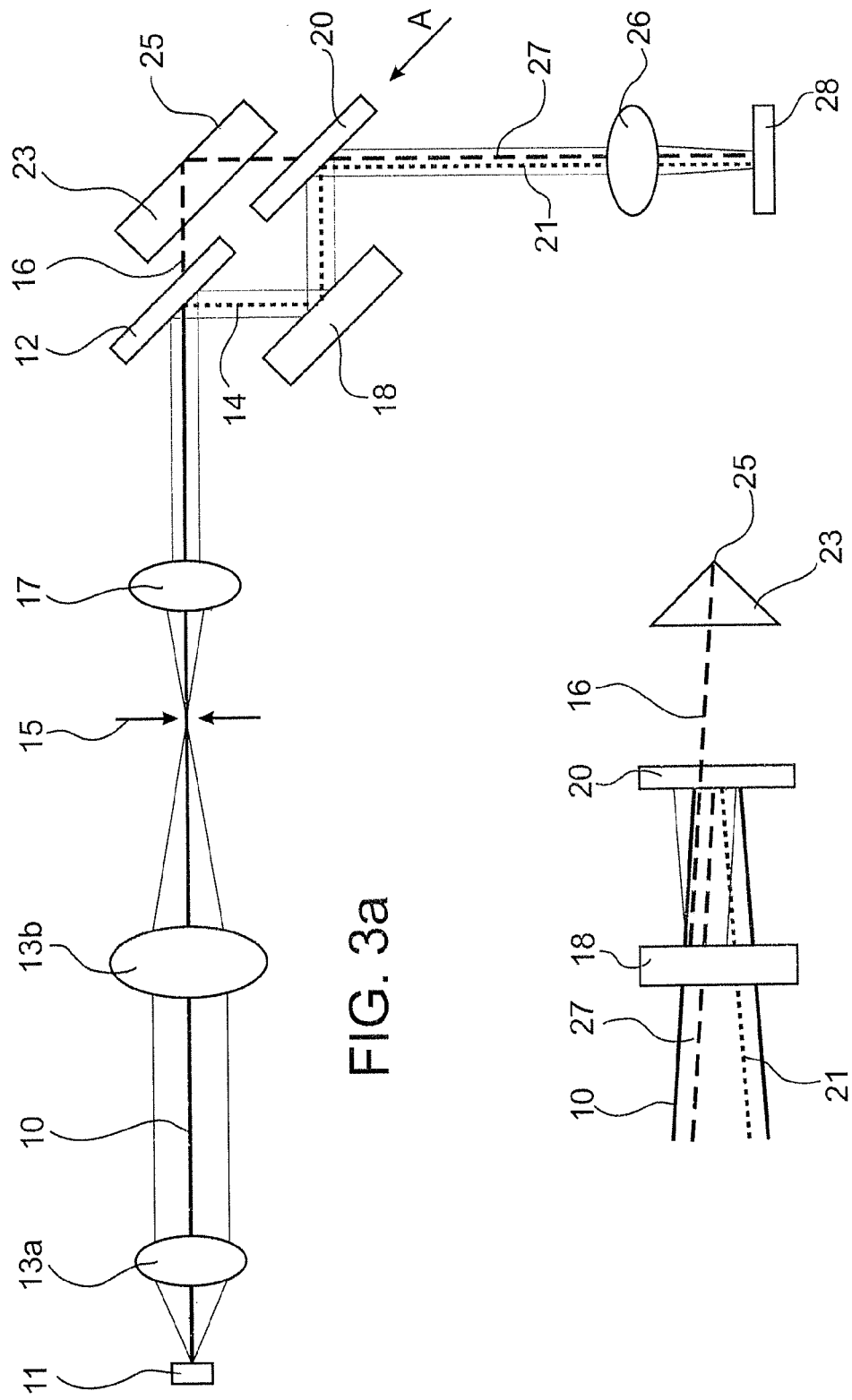

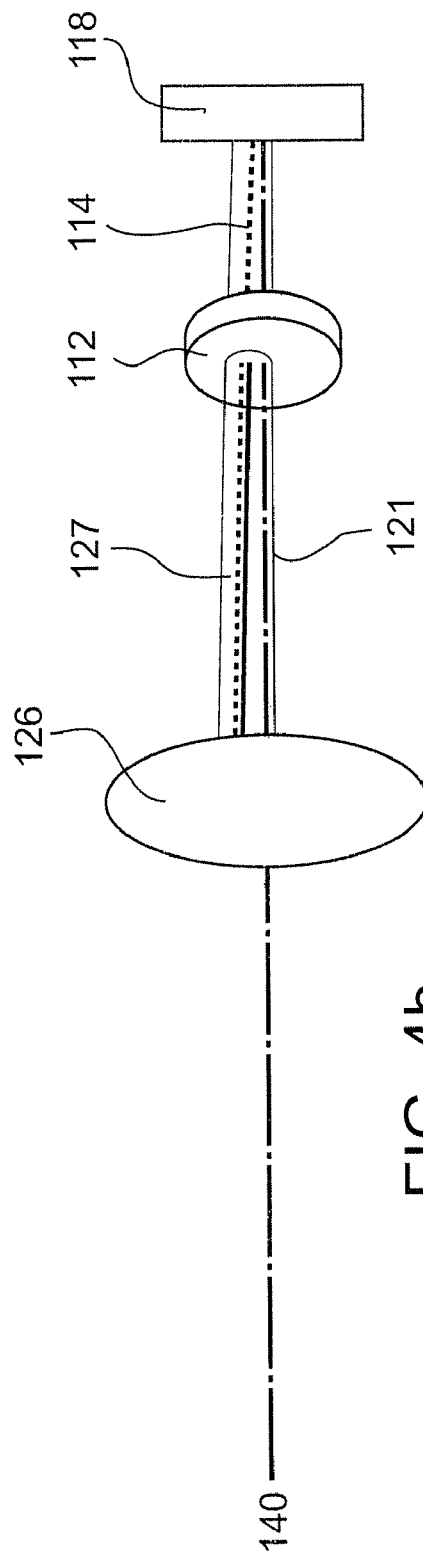
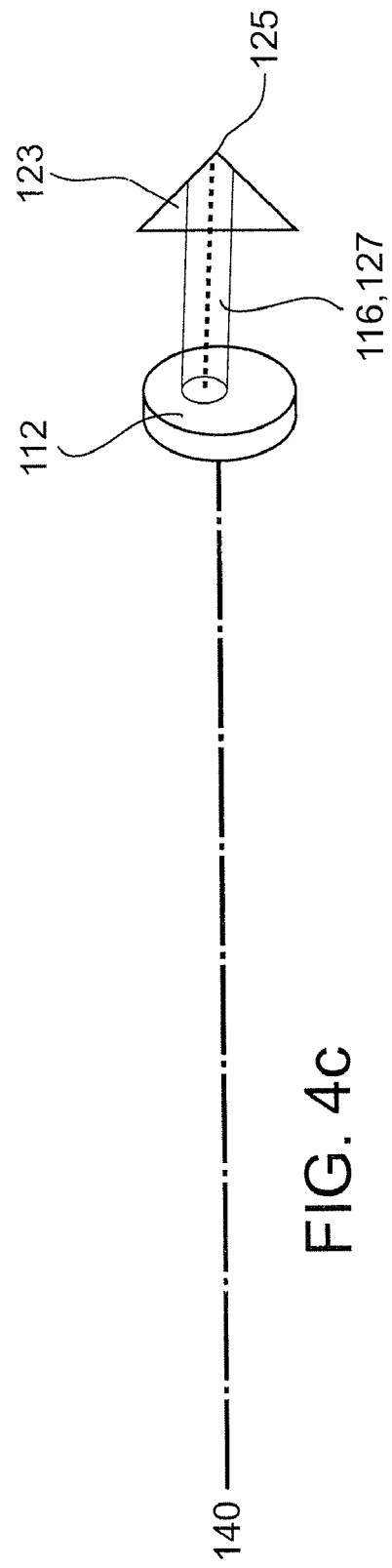
FIG. 4b
FIG. 4c

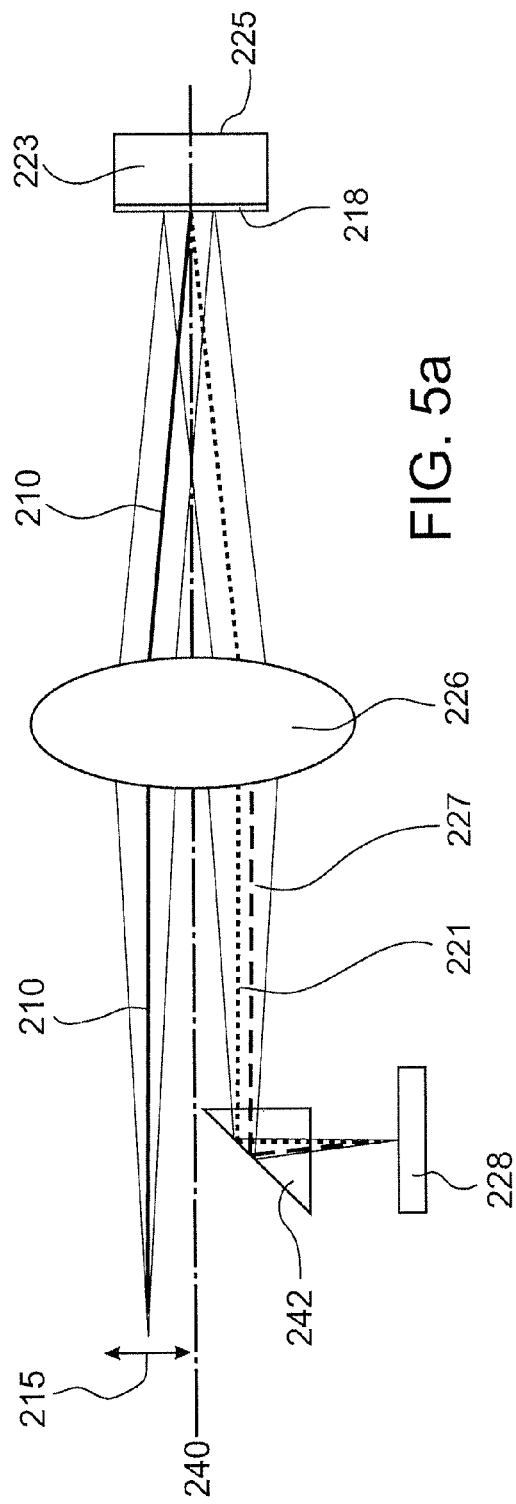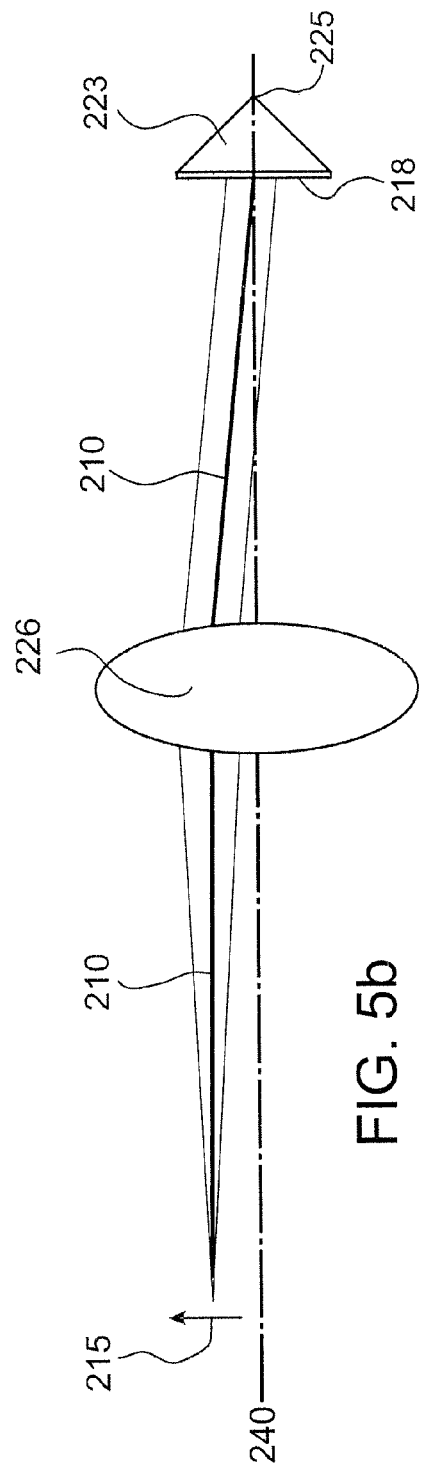
FIG. 5a
FIG. 5b

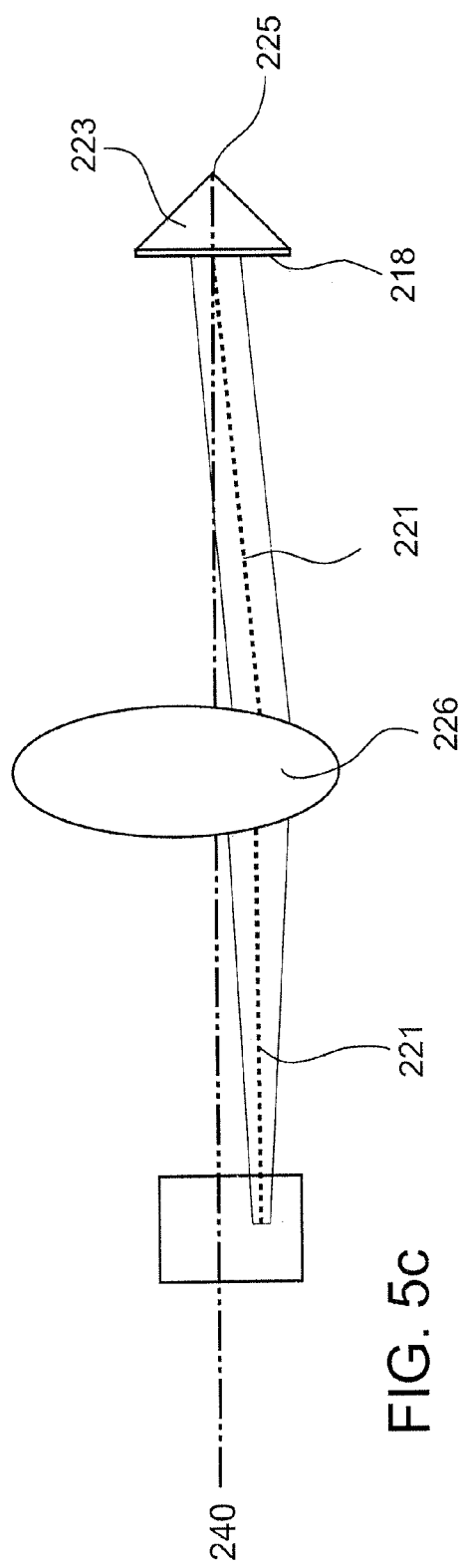
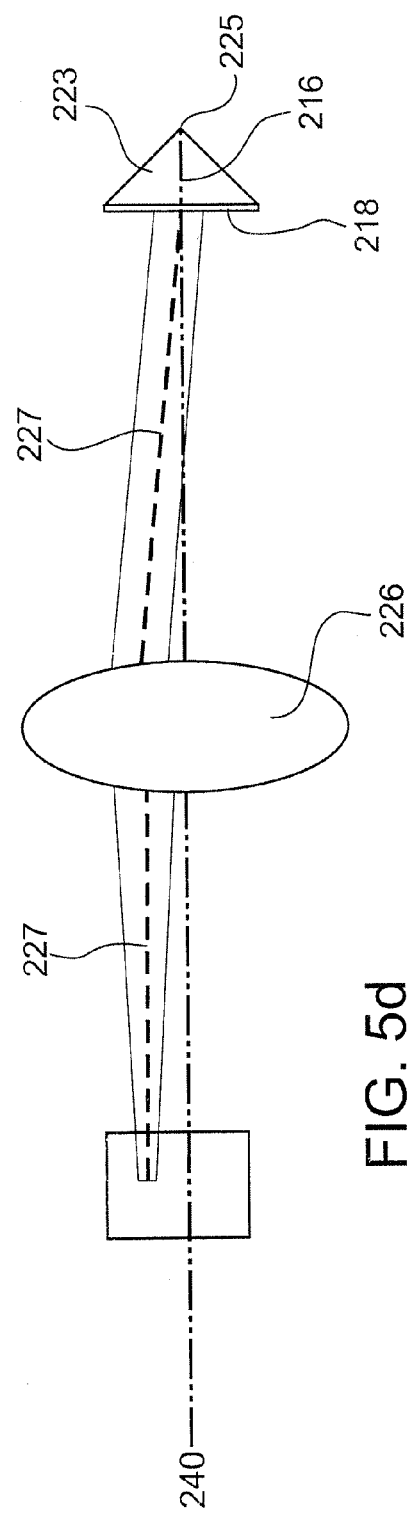

DUAL EMISSION MICROSCOPE

BACKGROUND OF THE INVENTION

1. Field of the Invention

The present invention relates to a microscope device, which is capable of producing images of a sample in different spectral ranges ("colors") or polarisations on a single detector.

2. Description of Related Art

In 1991 a method for separating a microscope image into two images of different color placed next to each other on a single camera chip was proposed (K. Kinosita et al., "Dual-View Microscopy with a Single Camera: Real-Time Imaging of Molecular Orientations and Calcium", J. Cell. Biol., 1991, 115(1), pages 67-73); see also U.S. Pat. No. 5,337,081). The commercial version of this concept was termed "w-View" because it not only provides a "double view" of the sample, but also because of the w-shape of the beam path it employs. (http://jp.hamamatsu.com/resources/products/sys/pdf/eng/e_aqfret.pdf). The design is used in all fields of microscopy where dual-emission images need to be recorded. Given that it allows recording two color images simultaneously rather than sequentially, the device is particularly suited for time-lapse studies, where switching of an emission filter would reduce time resolution.

A schematic of the W-view design as used in the prior art is shown in FIG. 1. A collimated image beam 10, originating from an intermediate image (which is not shown in FIG. 1) impinges onto a first dichroic beam splitter 12 and is separated into a first beam 14 and a second beam 16 of different color, i.e. the first beam 14 essentially consists of light of a first spectral range and the second beam 16 essentially consists of light of a second spectral range. The first beam 14, which is reflected by the first beam splitter 12, passes to a mirror 18 from where it is directed onto a second dichroic beam splitter 20, which has the same spectral characteristics as the first beam splitter 12. The second beam 16, which is transmitted by the first beam splitter 12, is reflected by a second mirror 22 and directed onto the second beam splitter 20, where the first beam 14 and the second beam 16 are "reunited" (or "combined") in their general direction. However, by adjusting the mirrors 18 and 22 in an appropriate fashion, the two beams 21, corresponding to the first beam 14, and 27, corresponding to the second beam 16, exhibit a slight angular offset relative to each other, i.e. they diverge relative to each other to a certain degree, so as to yield the desired spatial separation on the detector chip (not shown in FIG. 1).

According to this prior art concept, color separation takes place in an infinity space of the optical beam path, which could be the space between the objective lens and the tube lens. However, in order to avoid image overlap from adjacent areas, it is advantageous to create an intermediate image and to confine it within boundaries defined by a suitable field-stop. Such field-stop has to reduce the field of view seen by the camera of the detector to one half of its original size, in order to accommodate the two semi-images projected side by side. Having an intermediate image requires a second set of optics (relay-lenses), which create another infinity space where beam separation takes place. One major advantage of this design is that using a beam splitter not only for separating beams, but also for reuniting them, allows maintaining telecentric optics throughout, thus avoiding vignetting and asymmetrical light-cones which are different for different areas on the detector chip. Moreover, the fact that both beam paths are transmitted by the same optics warrants that both color channels experience identical magnification and need no resealing before being compared. This is particularly important in co-localization studies.

However, since no optical system is perfect, there are always aberrations and distortions, and their extent depends on the position of a given point within the field. Usually, aberrations are less pronounced in the center and increase towards the edges of the field. However, due to the spherical symmetry of the imaging optics, aberrations and distortions are generally symmetrical with respect to the central axis of the optics.

According to U.S. Pat. No. 5,982,479 a single dichroic beam splitter may be used for separating a collimated image beam originating from an intermediate image into two different color channels, which are imaged by a common lens onto a common detector chip in order to obtain spatially separated semi-images on the detector. Each of the color channels is reflected twice prior to being projected onto the detector, whereas according to the prior art system shown in FIG. 1, both color channels are reflected 3 times or, in the original Kinosita paper, one color channel is not reflected at all whereas the other one is reflected 4 times A similar system is known from JP 2004361391 A, wherein splitting of the two color channels and double-reflection in each channel occurs in the space between the projection lens and the detector. All prior art has in common that the number of reflections for the two beam-paths are such that both color channels have the same handedness on the chip.

It is an object of the invention to provide for a microscope device having dual emission capability, wherein detrimental effects of image-aberrations and -distortions are reduced.

SUMMARY OF THE INVENTION

According to the invention, this object is achieved by a microscope device as defined in claims 1 and 16, respectively, which enables separate "color channels" and by a microscope device as defined in claims 25 and 26, respectively, which enables separate "polarisation channels".

The invention is beneficial in that, by providing the means for reflecting the one beam in a manner so as to invert its handedness and the means for reflecting the second beam in a manner so as to preserve its handedness, a fully symmetrical configuration is obtained, where corresponding image points in both color/polarisation channels all experience the same field-dependent aberrations, whereas in the prior art systems, which either maintain the handedness of both color/polarisation channels or invert handedness of both color/polarisation channels, image points, which are close to the center line in one image are close to the edge of the image in the other image, so that their aberrations differ.

This is schematically illustrated in FIGS. 2a and 2b, where the symmetry of the images resulting from the two color channels on the detector with regard to the symmetry of the multi-color intermediate image is shown for the prior art concepts (FIG. 2a) and for the present invention (FIG. 2a).

According to the microscope device defined in claim 1 or 25, each color/polarisation channel undergoes at least one additional reflection after having been separated from the other color/polarisation channel. This concept enables comfortable adjustment of the position of each of the color/polarisation channels on the camera-chip.

According to the microscope device as defined in claim 16 or 26, only one of the color/polarisation channels undergoes additional reflections after having been separated from the other color/polarisation channel, while for the other color/polarisation channel the reflection needed for separating and reuniting the two beams remains the only reflection. Thereby a particularly simple and compact design can be achieved. According to a preferred embodiment, the means for reflecting the second beam and the separating means are integrated within a single member.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIGS. 2a and 2b are schematic views of the image symmetry obtained by the color splitting arrangement of FIG. 1 of the prior art and a color splitting arrangement according to the present invention;

FIG. 3a is a schematic view of a microscope device according to the invention comprising a first embodiment of a color splitting arrangement;

FIG. 3b is a schematic view of the arrangement of FIG. 3a seen in the direction of the arrow A of FIG. 3a;

FIG. 4b is a schematic view of the arrangement of FIG. 4a seen in the direction of the arrow A;

FIG. 4c is a schematic view of the arrangement of FIG. 4a seen in the direction of the arrow B;

FIG. 5a is a view like FIG. 4a, with a third embodiment of a color splitting arrangement of a microscope device according to the invention being shown; and FIGS. 5b to 5d are a view of the arrangement of FIG. 5a seen in the direction of the arrow A, wherein the incident multi-color image beam, the outgoing first beam/color channel and the outgoing second beam/color channel, respectively, are shown.

DETAILED DESCRIPTION OF THE INVENTION

Figure 1:
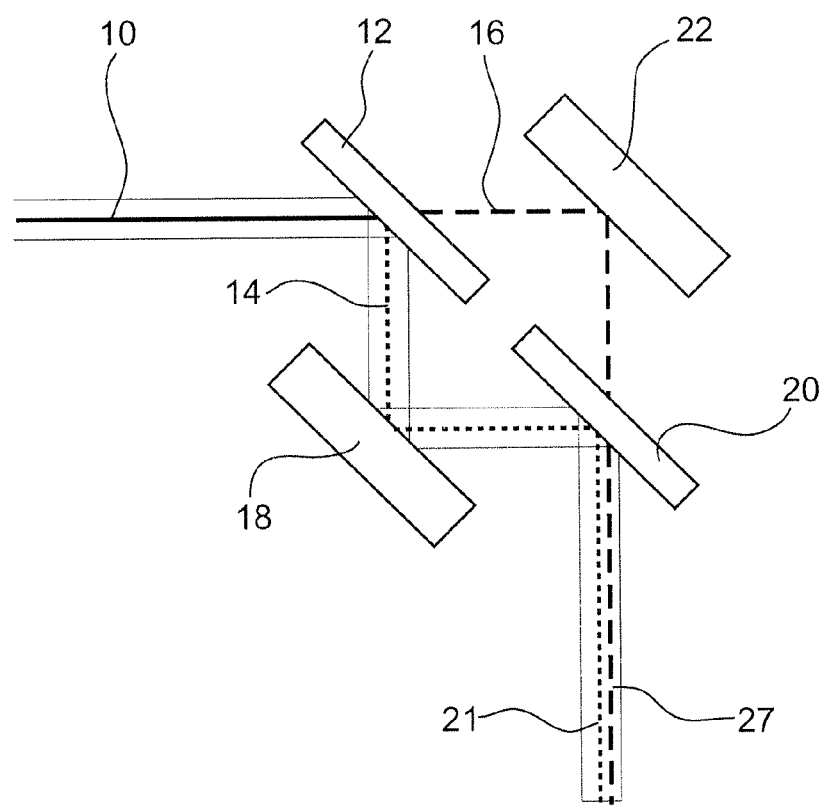
FIG. 1 is a schematic view of a color splitting arrangement for a microscope device having the "W-view design" according to the prior art.

FIGS. 3a and 3b show a first embodiment of a microscope device according to the invention, wherein a collimated multi-color beam 10 is generated by collecting light from a sample 11 by a compound microscope 13 (in the drawing consisting of objective 13a and tube lens 13b). The microscope creates an intermediate image 15 located in the focal plane of a projection lens 17. Typically, the light collected from the sample 11 will be emission light, in particular fluorescence emission light, such as emission light obtained from Fluorescence Resonance Energy Transfer (FRET). A first dichroic beamsplitter 12 serves to reflect one wavelength component of the beam 10 (if the dichroic is a long-pass, beam 14 is the short-wavelength-part of beam 10) toward a mirror 18, thereby generating a first beam 14, whereas the component of the beam 10, which is transmitted by dichroic 12, constitutes a second beam 16, which is directed towards a roof prism 23. While the first beam 14 is reflected by the mirror 18 towards a second dichroic beamsplitter 20, having the same spectral characteristics as the first beam splitter 12, the second beam 16 is deflected by the roof prism 23 in such way that it meets the first beam 14 at the second beam splitter 20. There the former is transmitted and the latter is reflected, thus reuniting beams 14 and 16 into a "combined" beam-bundle, consisting of beam 21 (formerly beam 14) and beam 27, formerly beam 16 (the reunited beams 21 and 27 are "combined" in the sense that they later pass through the same optical elements). For the arrangement to serve its purpose the roof-prism 23 must be oriented in such a manner that its ridge 25 is located within the plane defined by the first beam 14 and the second beam 16.

Beams 21 and 27 are projected by a projection lens 26 onto a detector 28 located in the focal plane of the lens 26, so that an image of the sample 11 is generated on the active area of the detector 28. In order to enable two images to be projected side by side onto the detector 28, the intermediate image 15 is confined to the boundaries of about half of the size of the active area of the detector 28.

Whereas in the view of FIG. 3a the outgoing portion 21 of the first beam 14 and the outgoing portion 27 of the second beam 16 are superimposed, FIG. 3a, showing the beam-splitting part of the microscope device in a view in the direction of the arrow A of FIG. 3a, discloses that in the plane perpendicular to the paper plane of FIG. 3a there is a slight angular offset between the beam portion 21 and the beam portion 27. This angular offset is turned into a spatial offset of the images on the detector 28 (not shown) by means of the projecting lens. The exact angular offset—and hence the corresponding spatial offset—is controlled by appropriate relative adjustment of the elements 12, 18, 20 and 23. Thereby two images of the sample 11 in two different spectral ranges which are determined by the beam splitters 12, 20 can be obtained side by side on a single detector 28.

The first beam 14 undergoes an odd number of reflections, namely three, so that the handedness of the first beam 14 is inverted with regard to the handedness of the incident multi-color beam 10, when being projected onto the detector 28. By contrast, the roof prism 23 acts as a retroreflector, with the second beam 16 undergoing an even number, namely two, reflections, so that the handedness of the second beam 16 is maintained with regard to handedness of the incident multi-color beam 10, when being projected on the detector 28. It can be seen from FIGS. 3a and 3b that the roof prism 23 acts as a retro-reflector only in one dimension, namely with regard to the direction perpendicular to the paper plane of FIG. 3a, whereas within the paper plane of FIG. 3a it acts as a "normal" reflector in that the incident angle equals the outgoing angle of the beam.

The image symmetry obtained by the arrangement of FIGS. 3a and 3b is schematically illustrated in FIG. 2b which shows the handedness of the intermediate image 15 and the handedness of the resulting images 30 and 32 obtained on the detector 28 by projection of the outgoing portion 21 of the first beam 14 and the outgoing portion 27 of the second beam 16, respectively. It can be seen that portions of the intermediate image 15 located close to the axial center line will be also located close to the axial center line for both final images, so that a fully symmetrical configuration is achieved wherein corresponding image points all experience the same field dependent aberrations when being projected by the projection lens 26.

By contrast, with the arrangement of FIG. 1 only for one of the final images 32' an image point close to the center line in the intermediate image 15' will remain close to the center line, whereas in the other final image 30' such an image point will be located close to the edge of the field (see FIG. 2a), so that the field dependent aberrations will be different for the two images 30' and 32'.

It is to be understood that in the arrangement of FIGS. 3a, 3b the beams are collimated between the projection lenses 17 and 26, i.e. there is an infinity space between the lenses 17 and 26. It is to be noted that in principle, rather than creating an angular offset of the beams 21 and 27 in a direction perpendicular to the paper plane of FIG. 3a, such angular offset could be alternatively achieved in the paper plane of FIG. 3a, so that in this case the beams 21 and 27 would coincide in the combined beam 24 in the view of FIG. 3b.

Figure 4A:
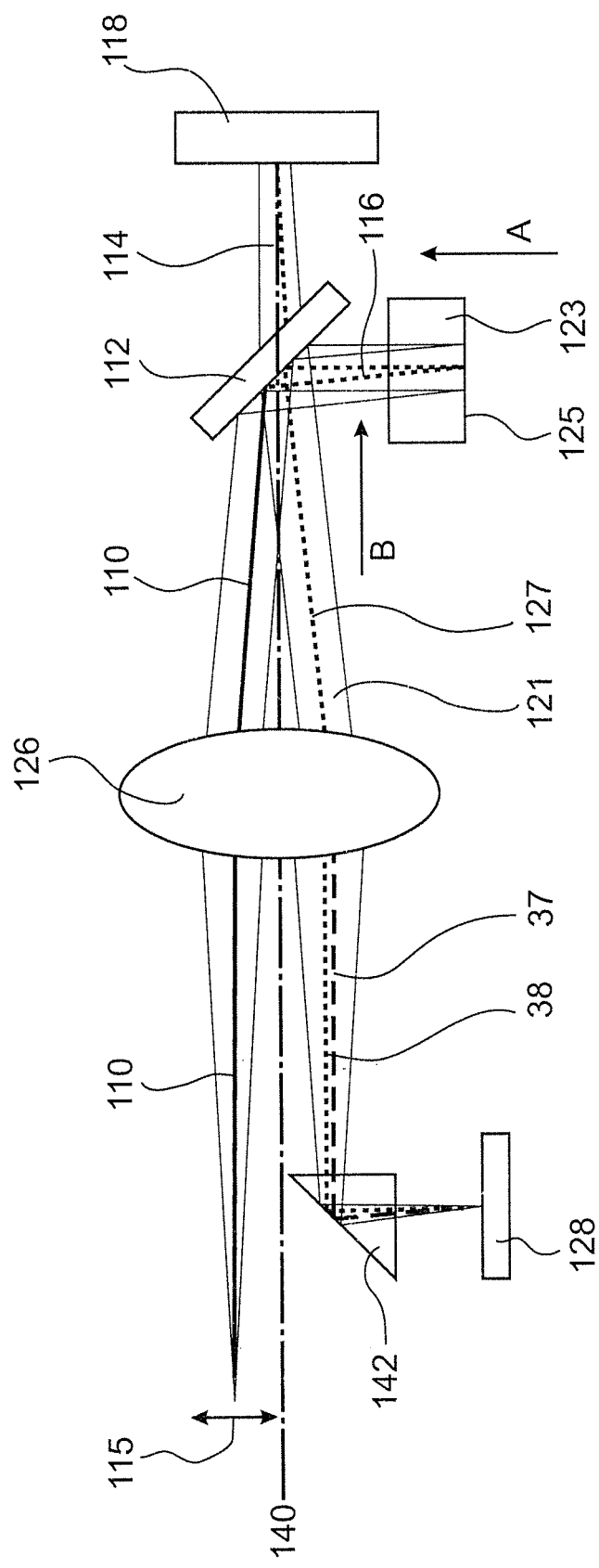
FIG. 4a is a schematic view of a microscope device according to the invention comprising a second embodiment of a color splitting arrangement.

FIGS. 4a through 4c show a modified embodiment wherein only a single dichroic beamsplitter 112 is used, instead of two dichroic beamsplitters 12 and 20 as in FIGS. 3a, 3b. In addition, rather than using two projection lenses 17 and 26, only a single projection lens 126 is used. Its purpose is not only to collimate beam 110, which originates from the intermediate image 115, but also to project the outgoing beams 37 and 38 next to each other onto the detector 128.

The intermediate image 115 of the sample 111 is located in the focal plane of the projection lens 126 and is confined to the boundaries of about half of the active area of the detector 128. It is off-center relative to the optical axis 140 of the projection lens 126 in both the dimension displayed in FIG. 4a (this off-center position allows separating the intermediate image 115 from the image on the detector 128) and in the dimension shown in FIG. 4b, which is perpendicular to the plane displayed in FIG. 4a.

Before the beam 110 intersects the optical axis 140 in the focal plane of the lens 126, it reaches a dichroic beamsplitter 112 which serves to separate the incident beam 110 into a first beam 114 which is transmitted by the beamsplitter 112 onto a mirror 118 and a second beam 116, which is reflected by the beam splitter onto a roof prism 23. The mirror 18 is located in the focal plane of the lens 126 and serves to reflect the first beam 114 back to the beamsplitter 12, where it is transmitted again. The mirror 118 is adjusted in such a manner that the out-going portion 121 of the first beam 114 has an angular offset with regard to the incident beam 110 in the paper plane of FIG. 4a. The roof prism 123 is arranged in such a manner that the ridge 125 of the prism 123 is located in the paper plane of FIG. 4a (in the shown example, the ridge 125 is parallel to the central optical axis 140) and that the second beam 116 received from the beamsplitter 12 is reflected back to the beamsplitter 12, where it is reflected again in such a manner that it forms an outgoing portion 127 which coincides in the view of FIG. 4a with the outgoing portion 121 of the first beam 114 reflected by the mirror 118 and transmitted by the beam splitter 112 in order to form a combined beam 124. With regard to the dimension perpendicular to the paper plane of FIG. 4a, the prism 123 acts as a retro-reflector, whereas it acts as a "normal" reflector in the dimension in the paper plane of FIG. 4a.

While in FIG. 4a the beamsplitter 112 is inclined at an angle of 45° with regard to the optical axis 140, smaller angles also are conceivable.

The reflecting elements 112, 118 and 123 are adjusted in such a manner that the outgoing portions 121 and 127 of the first beam 114 and the second beam 116 have a slight angular offset relative to each other in the direction perpendicular to the paper plane of FIG. 4a, so that the image of the first beam 114 and the image of the second beam 116 on the detector 128 have a spatial offset. In order to create these images, the outgoing portions 121 and 127 of the first beam 114 and the second beam 116 pass through the projection lens 126 and, now called beam 37 and 38, form separate images in the focal plane of lens 126.

As shown in FIG. 4a, a prism 142 may be provided in the outgoing beams 37 and 38 for deflecting these beams onto the detector 128, thus facilitating their separation from the incoming beam 110. Alternatively, the prism 142 may also be placed in the incoming beam 110.

Here again, as in the embodiment of FIG. 3a, 3b, in one of the two color channels (here that one formed by the first beam 114) the handedness is inverted (there is a single reflection at the mirror 118), whereas for the other color channel (here that one formed by the second beam 116) the handedness of the beam is maintained due to an even number of reflections (here: two reflections at the roof prism 123).

FIGS. 5a to 5d show an embodiment which is a simplified version of that of FIGS. 4a to 4c in that the functions of the beam splitter 112, the mirror 118 and the roof prism 123 are integrated into a single element 223. As in the embodiment of FIGS. 4a through 4c, the intermediate microscope image 215 is radially shifted with regard to the optical axis 240 of the projection lens 226 not only in the dimension extending in the paper plane of FIG. 5a, but also in the dimension extending perpendicular to the paper plane of FIG. 5a, see FIG. 5b. The intermediate image 215 is located in the focal plane of the projection lens 226. The collimated multi-color beam 210 is angled towards the optical axis 240 and impinges onto the element 223, which is a roof prism having a dichroic coating 218 on the front surface. The ridge 225 of the roof prism 223 is arranged in the paper plane of FIG. 5a, and the coated front surface 218 is essentially perpendicular to the optical axis 240. The dichroic surface 218 serves to split the incoming beam 210 into an outgoing first beam 221, which is reflected at the surface 218 towards the projection lens 226, and a second beam 216, which is transmitted by the surface 218 into the interior of the roof prism 223, where it is reflected back to the surface 218. Then the second beam 216 is transmitted through the dichroic surface 218 towards the projection lens 226, thus forming an outgoing beam portion 227. The roof prism 223 acts as a retro-reflector in the dimension perpendicular to the paper plane of FIG. 5a, whereas it acts as a "normal" reflector in the dimension extending in the paper plane of FIG. 5a Since the intermediate image 215 is radially shifted with regard to the optical axis 240 also in the dimension perpendicular to the paper plane of FIG. 5a, the collimated incident beam 210 is angled towards the optical axis 240 also with regard to that dimension (see FIG. 5b). Since with regard to that dimension the roof prism 223 acts as a retro-reflector, the second beam 216 transmitted by the surface 218 is reflected back in the direction of the incoming multi-color beam 210, so that—apart from the displacement of the combined beam 224 with regard to the incident multi-color beam 210 in the paper plane of FIG. 5a—beams 221 and 227 exhibit the same angle relative to the optical axis 240, but having opposite signs. This warrants that the images created from the two beams 221 and 227 by the projecting lens 226 are next to each other in the plane of the detector 228, in FIGS. 5b and 5c above and below the optical axis 240 but both touching it. Given that the first outgoing beam 221 has experienced one reflection in both dimensions whereas the outgoing portion 227 of the second beam 216 undergoes one reflection in one and two reflections in the other dimension, their respective images created by the projection lens 226 differ in their handedness.

It is to be understood that in all embodiments the dichroic beamsplitter could be either a short pass or a long pass.

Due to the finite spectral selectivity of the beamsplitters the spectral separation of the two color channels (first beam and second beam, respectively) in practice never will perfect, so that here a certain color channel is to be understood as consisting of light containing the associated spectral range in higher relative amount than the spectral range associated to the other color channel.

The above embodiments, which serve to provide for two separate color channels, also could be used to realize two separate polarisation channels. In this case the light collected from the sample would include two different polarisations and the dichroic beamsplitters would be replaced by beamsplitters which split the incoming mixed polarisation beam into two beams having different polarisation.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as encompassed by the scope of the appended claims.

What is claimed is:

1. A microscope device, comprising: means for creating a collimated beam of light collected from a sample and comprising at least a first spectral range and a second spectral range, means for separating the collimated beam into a first beam containing a higher percentage of light of the first spectral range than light of the second spectral range and a second beam containing a lower percentage of light of the first spectral range than light of the second spectral range, means for reflecting the first beam, means for reflecting the second beam, means for combining the first beam and the second beam, a detector, and means for imaging the combined first and second beam onto the detector in order to create an image of the sample derived from said first beam and an image of the sample from said second beam on the detector, wherein the means for reflecting the first beam and the means for reflecting the second beam are arranged in such a manner that the image created by the first beam and the image created by the second beam are shifted relative to each other on the detector, wherein the means for reflecting the first beam is adapted to invert handedness of the first beam, and wherein the means for reflecting the second beam is adapted to preserve handedness of the second beam.

2. The microscope device of claim 1, wherein the means for reflecting the first beam is for providing for a single reflection of the first beam.

3. The microscope device of claim 2, wherein the means for reflecting the first beam is a plane mirror.

4. The microscope device of one of the preceding claims, wherein the means for reflecting the second beam is for providing for two reflections of the second beam.

5. The microscope device of claim 1, wherein the means for reflecting the second beam is a retroreflector with regard to one dimension.

6. The microscope device of claim 5, wherein the means for reflecting the second beam is a roof prism.

7. The microscope device of claim 6, wherein a ridge of the roof prism is located in a plane defined by an incoming portion the second beam and a reflected portion of the second beam.

8. The microscope device of claim 1, wherein the means for separating the collimated beam is a first dichroic beamsplitter and wherein the means for combining the first and second beam is a second dichroic beamsplitter having a same spectral characteristics as the first dichroic beamsplitter.

9. The microscope device of claim 8, wherein the means for reflecting the second beam is arranged to reflect the second beam coming from the first dichroic beamsplitter onto the second dichroic beamsplitter, and wherein the means for reflecting the first beam is arranged to reflect the first beam coming from the first dichroic beamsplitter onto the second dichroic beamsplitter.

10. The microscope device of claim 1, wherein the means for separating the collimated beam and the means for combining the first and second beam is formed by a single dichroic beamsplitter.

11. The microscope device of claim 10, wherein the means for reflecting the second beam is arranged to reflect the second beam coming from the single dichroic beamsplitter back onto the single dichroic beamsplitter, and wherein the means for reflecting the first beam is arranged to reflect the first beam coming from the single dichroic beamsplitter back onto the single dichroic beamsplitter.

12. The microscope device of claim 1, wherein the means for creating a collimated beam comprise a projection lens and means for creating an intermediate image of the sample in a focal plane of the projection lens.

13. The microscope device of claim 12, wherein the means for imaging the combined first and second beam onto the detector comprises the projection lens and wherein the means for creating a collimated beam comprise a means for confining the intermediate image to half a size of an active area of the detector or less.

14. The microscope device of claim 13, wherein both dimensions of the intermediate image are radially shifted relative to an optical axis of the projection lens, and wherein the combined first and second beam as imaged by the projecting lens is radially shifted relative to the optical axis of the projecting lens and relative to the intermediate image.

15. The microscope device of claim 14, wherein in the combined first and second beam the first beam and the second beam are divergent relative to each other in a dimension perpendicular to that dimension of the intermediate image which is radially shifted relative to the optical axis of the projecting lens.

16. A microscope device, comprising: means for creating a collimated beam of light collected from a sample comprising at least a first spectral range and a second spectral range, means for separating the collimated beam into a first beam containing a higher percentage of light of the first spectral range than light of the second spectral range, which first beam is reflected by said separating means, and a second beam containing a lower percentage of light of the first spectral range than light of the second spectral range, which second beam is transmitted by said separating means, means for reflecting the second beam back to the means for separating the collimated beam in order to combine the first beam and the second beam, a detector, and means for imaging the combined first and second beam onto the detector in order to create an image of the sample on the detector, wherein the separating means and the means for reflecting the second beam are arranged in such a manner that the image created by the first beam and the image created by the second beam are shifted relative to each other on the detector, wherein the separating means is adapted to invert handedness of the first beam, and wherein the means for reflecting the second beam is adapted to preserve handedness of the second beam.

17. The microscope device of claim 16, wherein the means for reflecting the second beam and the beam separating means are integrated within a single member.

18. The microscope device of claim 17, wherein the means for reflecting the second beam is a retroreflector.

19. The microscope device of claim 18, wherein the means for reflecting the second beam is a roof prism, and wherein the separating means is a front face of the roof prism provided with dichroic coating.

20. The microscope device of claim 19, wherein the roof prism is arranged such that the first beam is reflected at an angle by the coated front face of the roof prism whereas the second beam is back-reflected within the plane formed by that angle in order to make the first beam and the second beam divergent relative to each other and relative to an optical axis of the projecting lens.

21. The microscope device of claim 16, wherein the means for creating a collimated beam comprise a projection lens and means for creating an intermediate image of the sample in a focal plane of the projection lens.

22. The microscope device of claim 21, wherein the means for imaging the combined first and second beam onto the detector comprises the projecting lens.

23. The microscope device of claim 22, wherein the means for creating a collimated beam comprise means for confining the intermediate image to half a size of an active area of the detector or less.

24. The microscope device of claim 23, wherein both dimensions of the intermediate image are radially shifted relative to the optical axis of the projecting lens, and wherein the combined first and second beam as imaged by the projecting lens is radially shifted relative to the optical axis of the projecting lens and relative to the intermediate image.

25. A microscope device, comprising: means for creating a collimated beam of light collected from a sample and comprising at least a first polarisation and a second polarisation, means for separating the collimated beam into a first beam containing a higher percentage of light of the first polarisation than light of the second polarisation and a second beam containing a lower percentage of light of the first polarisation than light of the second polarisation, means for reflecting the first beam, means for reflecting the second beam, means for combining the first beam and the second beam, a detector, and means for imaging the combined first and second beam onto the detector in order to create an image of the sample derived from said first beam and an image of the sample from said second beam on the detector, wherein the means for reflecting the first beam and the means for reflecting the second beam are arranged in such a manner that the image created by the first beam and the image created by the second beam are shifted relative to each other on the detector, wherein the means for reflecting the first beam is adapted to invert handedness of the first beam, and wherein the means for reflecting the second beam is adapted to preserve handedness of the second beam.

26. A microscope device, comprising: means for creating a collimated beam of light collected from a sample comprising at least a first polarisation and a second polarisation, means for separating the collimated beam into a first beam containing a higher percentage of light of the first polarisation than light of the second polarisation, which first beam is reflected by said separating means, and a second beam containing a lower percentage of light of the first polarisation than light of the second polarisation, which second beam is transmitted by said separating means, means for reflecting the second beam back to the means for separating the collimated beam in order to combine the first beam and the second beam, a detector, and means for imaging the combined first and second beam onto the detector in order to create an image of the sample on the detector, wherein the separating means and the means for reflecting the second beam are arranged in such a manner that the image created by the first beam and the image created by the second beam are shifted relative to each other on the detector, wherein the separating means is adapted to invert handedness of the first beam, and wherein the means for reflecting the second beam is adapted to preserve handedness of the second beam.

* * * * *